Aug. 2, 1949.  A. B. MILLER  2,478,000
HOT BEARING DETECTOR, AND SELF-CHECKING ELECTRICAL
APPARATUS FOR THE CONTROL THEREOF
Filed March 27, 1946

INVENTOR.
*Alfred B. Miller.*
BY
*HIS ATTORNEY.*

Patented Aug. 2, 1949

2,478,000

UNITED STATES PATENT OFFICE 2,478,000

HOT BEARING DETECTOR AND SELF-CHECKING ELECTRICAL APPARATUS FOR THE CONTROL THEREOF

Alfred B. Miller, Edgewood, Pa., assignor to The Union Switch & Signal Company, Swissvale, Pa., a corporation of Pennsylvania Application March 27, 1946, Serial No. 657,402

33 Claims. (Cl. 246—169)

My invention relates to hot bearing detectors, and to the provision of self-checking electrical apparatus suitable for the control thereof.

One object of my invention is to provide a hot bearing detector which is particularly suitable for, although in no way limited to, use on railway passenger cars or locomotives for detecting a defective axle or wheel bearing.

Another object of my invention is to provide a hot bearing detector in which the failure of any circuit or part of the equipment to function as intended will produce an indication rather than prevent one.

Another object of my invention is to provide a hot bearing detector which is unaffected by changes in ambient temperature or variations in the supply voltage.

Another object of my invention is to provide a hot bearing detector which provides both a visible and an audible indication upon the occurrence of a hot bearing.

A still further object of my invention is to provide a hot bearing detector which when used on passenger cars provides a means for automatically audibly signaling the engineman through the usual train signal line upon the occurrence of a hot bearing on any car of the train.

The apparatus of my invention embodies the principle of detecting variations in the temperature of the different wheel bearings by subjecting temperature sensitive electric circuit elements to the temperature variations to be detected and then measuring or comparing the impedance of these circuit elements. My invention includes means for measuring the resistance or impedance of electric circuit elements, and one of the objects of my invention is the provision of self-checking apparatus of this character comprising a Wheatstone bridge employing a "null" method of detection wherein the balanced condition is indicated by the release of a detector relay, but which has incorporated therein the closed circuit principle of operation which is a requisite for safety control devices by the expedient of periodically energizing the detector relay to check the integrity of the bridge circuits.

In respect to this and other features, the apparatus embodying my invention is an improvement upon that described and claimed in an application for Letters Patent of the United States, Serial No. 552,092, filed by G. W. Baughman on August 31, 1944, for Hot bearing alarms, now Patent No. 2,385,487, issued September 25, 1945, and is also an improvement upon that described and claimed in an application for Letters Patent of the United States, Serial No. 625,561, filed October 30, 1945, by George W. Baughman for Traffic controlling apparatus.

One feature of the present invention is the provision of means governed by the detector relay for causing its periodic operation to indicate a balance, thereby eliminating the code transmitter relay employed for that purpose in the prior systems referred to.

Another feature of the present invention is the provision of means for unbalancing two opposite arms of the bridge alternately in order to separately check the integrity of their circuits. A further feature is the provision of indication means effective upon a change in the impedance of one of the two circuit elements being compared for indicating which has the higher impedance.

The present application is a continuation-in-part of my application, Serial No. 611,289, filed August 18, 1945 for a Hot bearing detector, which has since been abandoned.

According to my invention I provide one or more Wheatstone bridge circuits each having included therein at least two temperature responsive resistance units disposed respectively in two different arms of the bridge in such manner that as long as the resistances of both of these units remain approximately the same the bridge will be balanced, but that a change in resistance of one unit without a corresponding change in the resistance of the other unit will unbalance the bridge. The two resistance units are subjected to the temperatures of two different bearings to be detected so as to provide a continual comparison of the temperatures of these bearings, and are preferably composed of ballast type wire with a high temperature coefficient of resistance which is approximately constant over a wide range of temperature. The remaining two arms of the bridge are ratio arms which include fixed resistance elements having a zero coefficient of resistance so that ambient temperature changes will not affect the balance of the bridge. The bridge is constantly energized from a suitable source of current which is connected across the two opposite terminals of the bridge comprising the junction of the two ratio arms and the junction of the two temperature responsive resistance units, respectively, through a ballast resistor to compensate for variations in voltage in the supply source, and employs a detector relay connected across the other two terminals of the bridge in such manner that the unbalancing of the bridge will cause the detector relay to become energized. The arm of the bridge which contains the one temperature responsive resistance unit also includes a contact of a first coding relay, while the arm of the bridge which contains the other temperature responsive resistance unit likewise includes a corresponding contact of a second coding relay. The apparatus further comprises a stepping relay controlled by the detector relay which operates in conjunction therewith to energize the two coding relays alternately to unbalance the bridge in opposite directions, and thereby effect the periodic operation of the detector relay provided the bridge is balanced insofar as said resistance units are concerned. The apparatus also includes a slow release checking relay controlled jointly by the coding relays and the stepping relay, which is maintained picked up only as long as their periodic operation continues, together with a slow release repeater of the checking relay which functions jointly with the checking relay to control an electroresponsive valve connected in the signal line for the purpose of providing an audible signal in the engine when an overheated bearing occurs. A pneumatically operated switch automatically connects a source of energy to the apparatus when and only when the car is coupled in a train, and an indication as to which of the bearings is overheated is provided by a visual indication device such as a lamp controlled by the detecting relay and the checking relay.

Other objects and characteristic features of my invention will become apparent as the description proceeds.

I shall describe one form of hot bearing detectors embodying my invention, and shall then point out the novel features thereof in claims.

In the accompanying drawings.

Similar reference characters refer to similar parts in both views.

For convenience in illustrating my invention and because my invention is particularly applicable to use on railway passenger cars, I have shown it in the drawings in the form it would assume when employed on a passenger car of the well known two-truck four-axle type, but it should be distinctly understood at the outset that my invention is not limited to this particular form or this particular application.

Figures 1, 2:
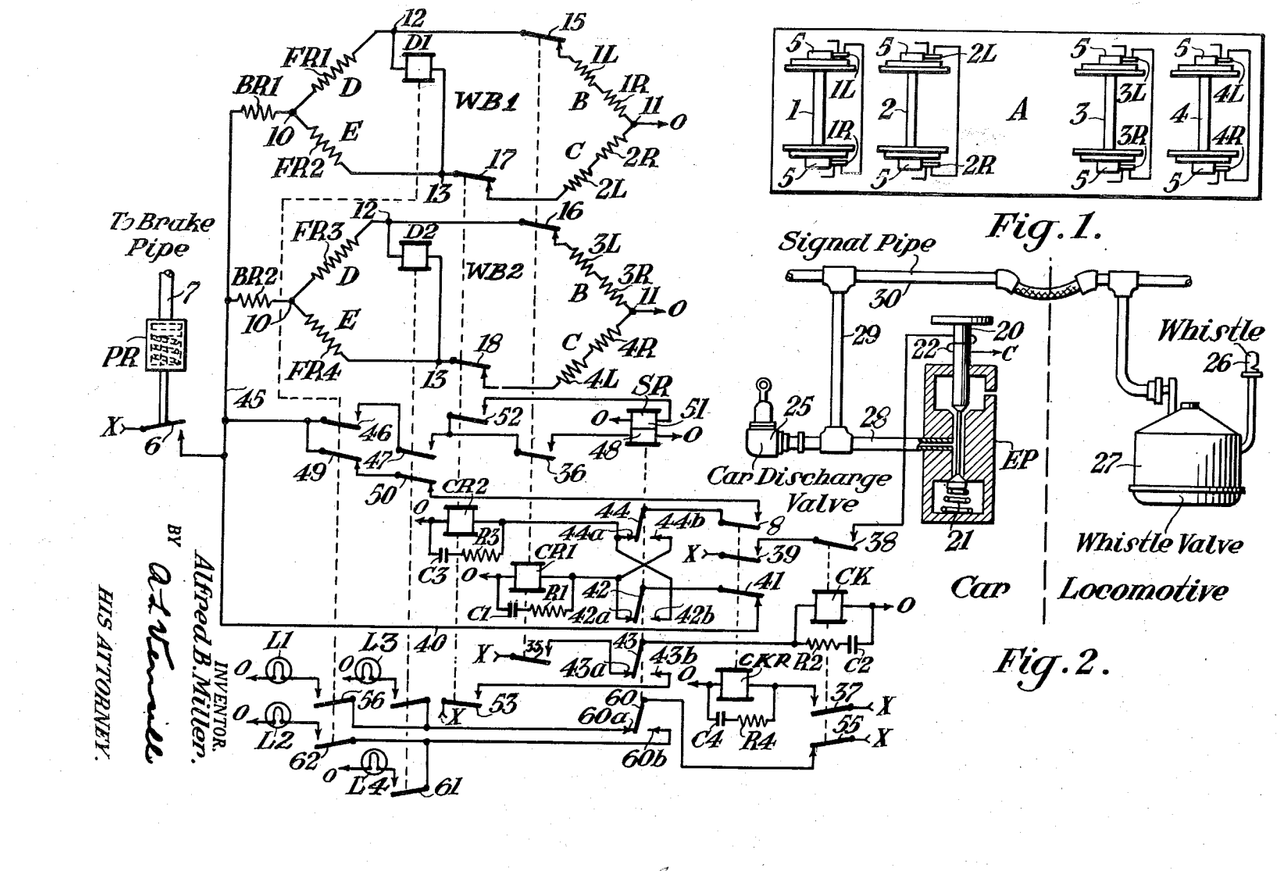
Fig. 1 is a diagrammatic view showing a railway car A having applied thereto certain of the elements of a bearing detector constructed in accordance with my invention.
Fig. 2 is a diagrammatic view illustrating one form of bearing detector employing the elements shown in Fig. 1 and embodying my invention.

Referring first to Fig. 1, the reference character A designates a railway car, the axles 1, 2, 3 and 4 of which are supported at their ends in journal boxes 5 of any of the usual and well-known types. Associated with each journal box in a manner to be constantly subjected to the temperature of the axle bearing housed therein is a temperature sensitive resistance unit designated by the same reference character as the reference character for the associated axle with the distinguishing subscript L or R according as the resistance unit is disposed at the left-hand or right-hand end of the car axle, as viewed from the left in Fig. 1. For example, in bearings employing the usual journal brasses, each resistance unit may be mounted in a hole drilled in the outer end of the journal brass of the associated bearing. Each resistance unit preferably comprises a coil of ballast type wire having a high temperature coefficient of resistivity which coefficient is practically constant over a wide temperature range so that the resistance of the unit will change a relatively large amount in response to the change in temperature which normally takes place in a bearing when the bearing starts to become defective.

Referring now to Fig. 2, I have here shown two identical Wheatstone bridges WB1 and WB2. Two of the adjoining arms B and C of each bridge comprise the resistance units associated with two different axles of the car A, and the remaining two arms D and E of each bridge comprise fixed resistors each designated by the reference character FR with a suitable distinguishing subscript. It is immaterial how the various resistance units associated with the car A are grouped in the arms B and C of the two bridges so long as each arm includes the two units in series associated with the same axle, but for convenience I have shown the resistors associated with the two axles on the same truck disposed in the two arms of the same bridge since this grouping of the resistance units tends to simplify the circuit wiring on the car. The fixed resistors FR are preferably constructed of a material having a zero temperature coefficient of resistance so that ambient temperature changes will not affect the balance of the bridges. The resistances of the various resistance units and resistors are so chosen, and the parts are so proportioned that when the temperatures of all of the bearings are substantially uniform as will be the case when all of the bearings are functioning properly, the bridge will be substantially balanced. It will be apparent, therefore, that the heating of either or both bearings on any axle of the car will unbalance the associated bridge.

The bridges are each energized from a suitable source of direct current which may, for example, comprise the usual car lighting battery. Since the nature of this source is not important, only the terminals X and O thereof are shown in the drawing. The source is connected across the two opposite terminals 10 and 11 of each bridge over a suitable energizing circuit which will be obvious from the drawing. Included in each of these energizing circuits is a ballast resistor designated by the reference character BR with a suitable distinguishing subscript, the function of which is to compensate for the effects of variations in voltage of the current supply upon the operation of the apparatus, as will appear more fully hereinafter.

Also included in each energizing circuit is the contact 6 of a pneumatic relay PR. This relay is connected through the medium of a pipe 7 to a brake pipe in such manner that it will close its contact 6 when and only when the brake pipe is supplied with fluid pressure. It will be seen, therefore, that the pneumatic relay PR functions to connect the bridges with the current supply when and only when the car is coupled in a train.

Connected across the terminals 12 and 13 of the bridge WB1 is a detector relay D1 for detecting the balanced or unbalanced condition of this bridge, and connected across the terminals 12 and 13 of the bridge WB2 is a similar detector relay D2. The relays D1 and D2 may be of any desired type, but as here illustrated these relays are neutral relays, one well-known form of which is disclosed and claimed in Letters Patent of the United States No. 1,815,947, granted to Lloyd V. Lewis on July 28, 1931, for Electrical relay. The parts are so proportioned that each of these relays will be deenergized except when the bridge is unbalanced due to a difference in resistance between the arms B and C of the associated bridge.

The arm B of the bridge WB1 includes the back contact 15 of a coding relay CR1 and the arm C of the bridge WB1 similarly includes the back contact 17 of a coding relay CR2. Corresponding contacts 16 and 18 of the relays CR1 and CR2 are included in the arms B and C of the bridge WB2. Under normal conditions, that is to say when the four resistance units associated with each bridge are at approximately the same relative temperatures these coding relays are alternately energized at a constant rate in a manner which will be described presently to periodically unbalance the bridge by first opening the one arm and then the other of the bridge to thereby cause the detector relays D1 and D2 to alternately pick up and release at a constant rate for a purpose which will be made clear presently.

The apparatus further comprises a stepping relay SR, a checking relay CK, a repeater relay CKR of the checking relay CK, an electropneumatic valve EP and four indicators here shown as lamps L1, L2, L3 and L4.

The stepping relay SR may be of any desired type, but as here shown it is a two winding polar relay, one wellknown form of which is disclosed and claimed in Letters Patent of the United States No. 2,140,604, granted to Clarence S. Snavely on December 20, 1938, for Electrical relay.

The checking relay CK and repeater relay CKR may be of any suitable type of relay which can be provided with slow releasing characteristics by means of an associated condenser snub.

The electropneumatic valve EP comprises an armature 20 biased to an upper position by means of a spring 21 and provided with an energizing winding 22. This valve is connected with the usual car signal pipe 30 in multiple with the usual car discharge valve 25 by means of pipes 28 and 29 in such manner that when this valve is deenergized it will vent the signal pipe to atmosphere to thereby produce a reduction in pressure in the signal pipe. As is well known, the signal pipe extends throughout the length of the train and is connected on the locomotive with a whistle 26 through the medium of a whistle valve 27. The whistle valve may have any desired construction, one well-known form of which is described in detail in Letters Patent of the United States No. 2,028,605, granted to E. E. Hewitt on January 21, 1936 for a Signal valve device. It will be understood that whenever a reduction of the pressure in the signal pipe 30 of at least a certain duration occurs due either to operation of the car discharge valve 25 or to deenergization of the electropneumatic valve EP, the whistle valve 27 will operate to cause fluid under pressure to be supplied from the signal pipe, as well as from a charged chamber or reservoir in the whistle valve, to the whistle 26 to thereby blow the whistle.

The operation of the apparatus as a whole is as follows: When the car is uncoupled from the train fluid pressure is, of course, vented from the brake pipe and under these conditions the pneumatically operated relay PR opens its contact 6. The opening of this contact removes energy from both bridges and also interrupts all of the energizing circuits for the relays CR1, CR2 and SR. These relays and the detector relays D1 and D2 are therefore all deenergized. With the relays CR1 and CR2 deenergized, all circuits for relay CK are open and this relay is also deenergized. The deenergization of this latter relay interrupts the energizing circuit for the repeater relay CKR and also the circuit for the electropneumatic valve EP, so that the relay CKR and the valve EP are likewise deenergized. The circuits for the lamps L1, L2, L3 and L4 are all open at contacts of the relays D1 and D2 so that there lamps are all extinguished.

When the car is coupled into a train and air pressure is connected to the brake pipe, pneumatically operated relay PR closes its contact 6, and thus causes energy to be applied to both bridge circuits. However, due to the fact that the axle bearings are initially all at the same temperatures the bridges WB1 and WB2 are initially balanced and the relays D1 and D2 therefore both remain deenergized. The closing of contact 6 of the pneumatic relay PR, in addition to applying energy to the bridge circuits, completes an initial energizing circuit for the coding relay CR1 or the coding relay CR2 depending upon whether the contacts of the stepping relay SR then occupy their normal positions as shown or their reverse positions. The initial energizing circuit for the relay CR1 may be traced from terminal X of the source through contact 6 of relay PR, wire 40, back contact 41 of relay CKR, normal contact 42—42a of relay SR, and the winding of relay CR1 in multiple with a resistance R1 and a condenser C1 in series to the other terminal 0 of the source, while the initial energizing circuit for the relay CR2 may be traced from terminal X of the source through contact 6 of relay PR, wire 40, back contact 41 of relay CKR, reverse contact 42—42b of relay SR, and the winding of relay CR2 in multiple with a resistor R3 and condenser C3 in series to the other terminal 0 of the source. Assuming that the normal contacts of relay SR are closed so that the initial energizing circuit for relay CR1 becomes closed, this relay will pick up and will open its back contacts 15 and 16 and will close its front contacts 35 and 36. The opening of the back contacts 15 and 16 of relay CR1 unbalances both of the bridges WB1 and WB2 and the detector relays D1 and D2 therefore both pick up. The closing of front contact 35 of coding relay CR1 completes a circuit for the check relay CK passing from terminal X of the source through front contact 35 of relay CR1, normal contact 43—43a of stepping relay SR and the winding of relay CK in multiple with a resistance R2 and a condenser C2 in series to the other terminal 0 of the source. The checking relay CK therefore picks up and completes at its front contact 37 a circuit for the repeater relay CKR so that this latter relay now also picks up. The circuit for the relay CKR is obvious from an inspection of the drawing, it being noted that this circuit includes in multiple with the winding of the relay a condenser C4 and a resistance R4 in series to render this relay slow releasing. With the relays CK and CKR both energized a circuit for the electropneumatic valve EP including front contact 39 of relay CKR and front contact 38 of relay CK becomes closed, and this valve therefore becomes energized to prevent the venting of fluid from the signal pipe through this valve. The previously described picking up of the detector relays D1 and D2 completed a circuit for the lower winding 48 of the stepping relay SR which circuit may be traced from terminal X of the source through contact 6 of pneumatic relay PR, wire 45, front contact 46 of detector relay D1, front contact 47 of detector relay D2, front contact 36 of coding relay CR1 and the winding 48 to the other terminal O of the source. The current flowing in this circuit traverses the winding 48 in the direction to cause relay SR to close its normal contacts, but since the normal contacts of this relay are already closed, the closing of this circuit under these conditions has no effect on the operation of the remainder of the apparatus.

The previously described picking up of the relay CKR, in addition to completing the circuit for the electropneumatic valve EP, also interrupted at its back contact 41 the previously traced energizing circuit for the coding relay CR1, thereby causing this relay to become deenergized. Due, however, to the presence of the snubbing circuit formed by the resistance R1 and condenser C1, this relay retains its armature in its attracted position for a predetermined time interval following the interruption of its energizing circuit. However, after the expiration of this time interval this relay opens its front contacts 35 and 36 and closes its back contacts 15 and 16. As soon as the contacts 15 and 16 become closed, all four arms of both bridge circuits are again closed, and if the temperatures of the axle bearings are still all approximately the same as will normally be the case, both bridge circuits will again become balanced and the detector relays D1 and D2 will therefore both release. As soon as the detector relays D1 and D2 release an energizing circuit becomes completed for the coding relay CR2 passing from terminal X through contact 6 of pneumatic relay PR, wire 45, back contact 49 of detector relay D1, back contact 50 of detector relay D2, front contact 8 of repeater relay CKR, normal contact 44—44a of stepping relay SR and the winding of relay CR2 in multiple with resistor R3 and condenser C3 in series to the other terminal O of the source. The resultant picking up of the coding relay CR2 interrupts at its contacts 17 and 18 the arms C of the bridges WB1 and WB2 thereby again unbalancing both of these bridges and hence causing the detector relays D1 and D2 to again become energized. When these detector relays become energized, the circuit which caused the coding relay CR2 to become energized is immediately interrupted at contacts 49 and 50 of the relays D1 and D2, respectively, but due to the snubbing circuit provided by the resistance R3 and condenser C3 connected in multiple with the relay winding this relay retains its armature in its attracted position for an appreciable period of time after the circuit for the relay becomes interrupted. The length of time required for this relay to release is determined primarily by the capacity of the condenser C3 and resistance of the resistor R3 and can be varied to provide the release time required for the proper operation of the circuit by varying the capacity of the condenser C3 and the resistance of the resistor R3. With the relay CR2 in its picked-up position and with the relays D1 and D2 both energized, an energizing circuit is completed for the upper winding 51 of the stepping relay SR which circuit may be traced from terminal X of the source through contact 6 of the pneumatic relay PR, wire 45, front contact 46 of detector relay D1, front contact 47 of detector relay D2, front contact 52 of coding relay CR2, and the winding 51 of stepping relay SR to the other terminal O of the source. The completion of this circuit causes relay SR to open its normal contacts and close its reverse contacts. As soon as the stepping relay closes its reverse contact 43—43b, another energizing circuit becomes completed for the checking relay CK including this contact and front contact 53 of relay CR2, and the checking relay CK therefore again becomes energized. Relay CK is made sufficiently slow releasing by the associated snubbing circuit provided by the condenser C2 and the resistor R2 so that when this energizing circuit becomes closed the armature of this relay will still be picked up. It will be apparent, therefore, that the repeater relay CKR and the electropneumatic valve EP will remain energized during the time interval which elapses between the opening of the first traced energizing circuit for relay CK and the closing of the last mentioned energizing circuit for this relay.

When the coding relay CR2 finally releases its armature at the expiration of its slow release time, energy is again removed from the checking relay CK by virtue of the opening of front contact 53 of relay CR2 and the bridge arms C of both bridges WB1 and WB2 are again closed by virtue of the closing of back contacts 17 and 18 of relay CR2. If the axle bearings are still all at approximately the same temperatures, the closing of the arms C of the bridges WB1 and WB2 will again balance these bridges and the relays D1 and D2 will again both release. As soon as the detector relays D1 and D2 release, another energizing circuit is completed for the coding relay CR1 passing from terminal X through contact 6 of pneumatic relay PR, wire 45, back contact 49 of detector relay D1, back contact 50 of detector relay D2, front contact 8 of repeater relay CKR, reverse contact 44—44b of stepping relay SR and the winding of coding relay CR1 in multiple with resistance R1 and condenser C1 in series to the other terminal O of the source. Relay CR1 therefore again picks up and again opens at its contacts 15 and 16 the B arms of both bridge circuits WB1 and WB2 so that both bridges are again thrown out of balance to thus cause the detector relays D1 and D2 to again pick up. The picking up of these relays this time interrupts at contacts 49 and 50 of these relays the circuit for the coding relay CR1, but the relay CR1 does not immediately release its armature because of the snubbing circuit provided by the resistor R1 and condenser C1. The picking up of the detector relays D1 and D2 now also completes the previously traced circuit for the lower winding 48 of stepping relay SR and since the contacts of this relay are in their reverse positions, the completion of this circuit causes these contacts to move to their normal positions. As soon as the normal contacts of relay SR close, relay CK again becomes energized by virtue of the previously traced circuit including normal contact 43—43a of stepping relay SR and front contact 35 of coding relay CR1. When relay CK becomes energized, its armature will still be in its picked-up position due to the slow releasing characteristics of the relay and the completion of this circuit does not therefore cause any change in the circuits controlled by this relay so that the repeater relay CKR and the valve EP remain energized. When relay CR1 finally releases at the end of its time element, the B arms of both bridges again become closed and if the four bearings controlling the temperatures of the resistance units included in the arms B and C of both bridges are still at the same temperature, both bridge circuits will again be balanced and both detector relays will again release. The releasing of these relays will cause the coding relay CR2 to pick up to again open the arms C of both of these bridges which will again cause the detector relays D1 and D2 to pick up. It will be seen, therefore, that as long as the four bearings associated with each bridge circuit remain at equal temperatures, the relays CR1 and CR2 will alternately pick up and release and as long as the coding action of these relays continues, the checking relay CK, the repeater relay CKR, and the valve EP will all remain energized.

If the contacts of the stepping relay SR had happened to be in their reverse positions instead of their normal position when the car was first coupled into the train, the initial operation of the apparatus would be identical to that just described with the exception that the coding action would have commenced with the picking up of the relay CR2 instead of the picking up of the relay CR1. It is believed, therefore, that the operation under these latter conditions will be apparent from the foregoing and from an inspection of the drawing without further detailed description.

Normally when the car is first coupled into a train, all bearings will be at amient temperature which of course may vary anywhere from minus 40° F. or lower to plus 100° F. or higher. As the car attains speed, the temperatures of all of the bearings will increase until a normal operating temperature is reached. With proper lubrication the temperatures of all of the bearings will increase more or less uniformly during the warming up period and they will all level off at a more or less uniform operating temperature which, of course, will vary depending upon the load on the bearings, the speed of the car, the ambient temperature, etc. The resistances of the temperature sensitive units 1L, 1R, 2L, 2R, 3L, 3R, 4L and 4R will, therefore, increase more or less uniformly during the warming up period and will likewise level off at more or less uniform values when the normal operating temperatures of the bearings are reached. However, during this warming up period and after normal operating temperatures have been attained a certain temperature differential between bearings is to be expected and will be encountered and this temperature differential will, through the medium of the temperature sensitive resistance units in the bridge circuits, produce a certain amount of unbalance in the bridge circuits when both arms B and C of the bridges are closed during the coding action already described. A certain amount of current, therefore, will continue to flow in the detector relays when the bridge arms are all closed. For a given voltage on the bridge circuits, a given detector relay resistance, and a given temperature differential between the resistance units in the B and C arms of the bridges, the amount of current that will flow in the detector relays will depend upon the value of the fixed resistors FR1, FR2, FR3 and FR4 and can, therefore, within certain limits be made any desired amount by the proper selection of these fixed resistors. The resistances of these resistors are so chosen that the current flowing in the detector relays when both bridge arms are closed will be just slightly less than the release current of the detector relays when the temperature differential between the bearings is equal to the maximum temperature differential encountered under normal operating conditions. Accordingly, as long as the maximum normal temperature operating differential between the bearings is not exceeded, the current flowing in the detector relays with all of the bridge arms closed will always be less than the release current of the detector relays. The detector relays will therefore normally always release when all of the bridge arms are closed and the coding action previously described will continue so that the EP valve for the signal line will normally remain continuously energized.

If, however, the normal temperature differential just referred to between bearings on different axles is exceeded for any reason either during the warming up period or after the bearings have reached their normal operating temperature, the current flowing in the detector relay of the bridge circuit including the resistance unit associated with the hot bearing will exceed the release current of the detector relay, and after this relay next picks up due to the opening of the contact located in the arm in which the resistance unit associated with the hot bearing is located, this relay will subsequently remain picked up. The detector relay in the other bridge circuit, however, will release. For example, I will assume that either one or both of the resistance units 1L and 1R associated with the axle 1 increases its resistance due to the overheating of the bearing associated with this axle. Under these conditions, the resultant increase in resistance of the arm B of the bridge WB1 will unbalance this bridge, and will cause current to flow in the winding of the relay D1 even when the contacts 15 and 17 are both closed so that all four arms of the bridge are closed. This current will be sufficient in magnitude to cause relay D1 to remain picked up after it is once picked up provided the picking up of this relay is caused by the opening of the contact 15, but will not be sufficient to pick up the relay. That is to say, if relay D1 picks up for the first time due to the opening of the contact 15 following the overheating beyond the danger point of a bearing associated with the axle 1, when the contact 15 next closes the current will continue to flow in the winding of the relay D1 in the same direction that it was flowing while the contact 15 was open, and since this current will have sufficient magnitude to prevent the relay D1 from releasing, this relay will thereafter remain picked up as long as the overheated bearing continues. However, if relay D1 picks up for the first time due to the opening of the contact 17 following the overheating beyond the danger point of the bearing with which the resistance units 1L and 1R are associated, then when the contact 17 next closes, the direction of current flow in the winding of the relay D1 will momentarily reverse and the relay D1 will therefore again release and remain released until the contact 15 opens to cause the relay to again pick up, after which time this relay will remain picked up as long as the overheated bearing continues for the reasons pointed out above.

Assuming now that axle 1 is at its normal temperature and the resistance of the resistance unit 2L or 2R increases abnormally due to the overheating to the danger point of one or both of the bearings associated with the axle 2, the relay D1 will again pick up and will thereafter remain picked up. However, the relay in this instance will not remain picked up until it is picked up for the first time, following the occurrence of the overheated bearing, due to the opening of the contact 17, for reasons which will be obvious from the foregoing discussion of the action of the relay D1 when an overheated bearing occurs in connection with the axle 1.

In a similar manner, if one of the bearings associated with the axle 3 or 4 overheats, the relay D2 will remain picked up after it is once picked up due to the opening of the contact 16 in the case of the overheated bearing occurring in connection with the axle 3, and due to the opening of the contact 18 in the case of the overheated bearing occurring in connection with the axle 4.

The fact that the relay D1 will not remain picked up until after it is picked up due to the opening of the contact 15 when an overheated bearing occurs in connection with the axle 1, or until after it is picked up due to the opening of the contact 17 when an overheated bearing occurs in connection with the axle 2, and the fact that the relay D2 will not remain picked up until after it is picked up due to the opening of the contact 16 when an overheated bearing occurs in connection with the axle 3, or until after it is picked up due to the opening of the contact 18, when an overheated bearing occurs in connection with the axle 4, is important for a reason which will appear presently.

When either one of the relays D1 or D2 remains picked up due to an overheated bearing, the normal energizing circuits for both of the coding relays CR1 and CR2 are interrupted, and these relays therefore both become deenergized and remain deenergized for a sufficiently long period of time to permit the checking relay CK to release. The releasing of this relay, in turn, will deenergize the repeater relay CKR and will also deenergize the electropneumatic valve EP. The deenergization of the valve EP will vent the signal pipe 30 to atmosphere and hence will cause the engineer's whistle 26 to sound in the manner described hereinbefore.

As soon as the release time of the repeater relay CKR expires, the resultant closing of the back contact 41 of this relay will complete an energizing circuit for relay CR1 or relay CR2 depending upon whether the contacts of the stepping relay SR are in their normal or reverse positions. If the contacts of the stepping relay are in their normal positions, then the relay CR1 will become energized over the circuit which initially became closed if these contacts were normal when the car was first coupled in the train. If, however, the contacts of the stepping relay are in their reverse positions, the relay CR2 will become energized over the previously traced circuit for this relay including back contact 41 of repeater relay CKR and reverse contact 42—42b of stepping relay SR. The energization of either one of the coding relays CR1 and CR2 under these conditions again completes the energizing circuit for the checking relay CK controlled thereby and this relay therefore again picks up. The picking up of this relay causes the repeater relay CKR to pick up and as soon as both of these relays become picked up, the electropneumatic valve EP again becomes energized and this terminates the blowing of the whistle which was initiated by the previous deenergization of the relay CKR.

The deenergization of relay CK following the occurrence of a heated bearing, in addition to causing the whistle to blow as just described, also completes an energizing circuit for one of the lamps L1, L2, L3 or L4 to indicate which one of the axles the overheated bearing is associated with. That is to say, if the overheated bearing is associated with axle 1, when relay CK becomes deenergized, relay D1 will be energized and the contacts of relay SR will be in their normal positions, and as a result, an energizing circuit will be completed for the lamp L1 passing from terminal X of the source through back contact 55 of relay CK, normal contact 60—60a of relay SR, front contact 56 of relay D1, and the filament of lamp L1 to the other terminal 0 of the source. If, however, the overheated bearing is associated with axle 2, then when relay CK becomes deenergized relay D1 will again be energized, but under these conditions, the contacts of relay SR will be in the reverse position, and as a result the deenergization of relay CK will complete a circuit for lamp L2 passing from terminal X of the source through back contact 55 of relay CK, reverse contact 60—60b of relay SR, front contact 62 of relay D1, and the filament of lamp L2 to the other terminal of the source.

In a similar manner, if the overheated bearing is associated with the axles 3 or 4, when relay CK becomes deenergized relay D2 will then be energized, and an energizing circuit for the lamp L3 or L4 will be completed. It is believed that the energizing circuits for the lamps L3 and L4 will be obvious from the drawing without detailed description.

It should be noted at this point that the reason why the contacts of the relay SR are left in their normal positions following the occurrence of an overheated bearing associated with either the axle 1 or the axle 3, is that whenever the contacts 15 or 16 are opened to cause the relays D1 or D2 to pick up following the occurrence of an overheated bearing for either the axle 1 or the axle 3, the energizing circuit for the lower winding 48 of relay SR is simultaneously closed at front contact 36 of relay CR1, and since the relay SR is of the type which, when deenergized, retains its contacts in their last energized position, when the relay CR1 subsequently becomes deenergized due to the energization of the relay D1, the contacts of the relay SR will remain in their normal position. Similarly, the reason why the contacts of the relay SR are left in their reverse position following the occurrence of an overheated bearing associated with either the axle 2 or the axle 4 is that whenever the contacts 17 or 18 are opened to cause the relay D1 or D2 to pick up following the occurrence of an overheated bearing for the axle 2 or axle 4, the energizing circuit for the upper winding 51 of the relay SR is simultaneously closed at front contact 52 of relay CR2, and when this relay becomes deenergized due to the picking up of the relay D2, the contacts of the relay SR will remain in their reverse positions.

When relay CK becomes reenergized in the manner previously described following its initial deenergization due to the occurrence of an overheated bearing, the lamp circuit which was previously closed at contact 55 will of course become opened and the lamp will then become extinguished.

When relay CKR picks up following the reenergization of relay CK, it interrupts the circuit which was previously closed at its back contact 41 for the relay CR1 or CR2 as the case may be and such relay therefore again becomes deenergized. Upon the release of this relay at the expiration of its time interval relay CK again becomes deenergized and deenergizes the relay CKR. The deenergization of the relay CK again causes the electropneumatic valve EP to become deenergized and the proper lamp to become illuminated. It will be seen, therefore, that as long as the heated bearing condition continues the cycle of operations just described will continue and intermittent blasts of the whistle and an intermittent illumination or flashing of one of the lamps L1, L2, L3 or L4, as the case may be, will occur. When the condition that causes the bearing to overheat is corrected and the bearing again assumes its normal operating temperature the apparatus will again assume its normal coding action and the electropneumatic valve in the signal line will remain energized.

It should be pointed out that the CKR relay is not necessarily an essential part of the detecting and indicating apparatus since a continuous audible indication could be obtained directly by means of the checking relay only. The CKR relay when provided merely makes it possible to produce a coding or pumping action which results in intermittent blasts of the whistle rather than a continuous blast. Accordingly for those railroads which prefer a continuous sounding of the whistle and a continuous lighting of the lamp L1, L2, L3 or L4 when an overheated bearing occurs, the relay CKR can be omitted. However, for those railroads which prefer an intermittent sounding of the whistle and a flashing of the lamp this relay would be provided, as shown.

It should also be pointed out that while in the drawing two bridge circuits controlled in multiple by the coding relays CR1 and CR2 have been provided, the apparatus can readily be modified to control only one bridge circuit or just as readily expanded to control a number of bridge circuits, the only limitation upon the number of bridge circuits that can be provided being in the number of contacts which can be provided on the coding relays CR1 and CR2.

It should further be pointed out that while as shown in the drawings each bridge circuit includes four separate resistance units associated with four different bearings, the bridge circuits can readily be modified to provide for only two bearings per bridge by omitting from the bridge one of the resistance units in each of the resistance arms B and C of the bridge or can be expanded to accommodate more bearings by providing a corresponding additional number of resistance units in the arms B and C of the bridge. In actual practice the number of bearings that can be safely accommodated by each bridge depends mainly upon (1) the maximum temperature differential between bearings encountered in normal operation, (2) the maximum actual temperature encountered in normal operation and (3) the maximum safe operating temperature of the bearings.

The ballast resistors BR1 and BR2 which are included in the energizing circuits for the bridges WB1 and WB2 are composed of the well-known high temperature coefficient ballast type wire, and by proper design can be made to maintain a practically constant voltage on the bridges within the limits of variation in the supply voltage normally encountered in practice. It follows, therefore, that these resistors insure that the detection of an overheated bearing will not be defeated by variations in the supply voltage.

Since as was pointed out hereinbefore in railway passenger car service the bearings are subjected to extremely large variations in the ambient temperature (minus 40° F. or lower to plus 100° F. or higher), it will be understood that both the normal operating temperature and the maximum safe operating temperature of the bearings will vary almost directly with variations in the ambient temperature. It is essential, for this type of service that the indicating temperature should also vary with the ambient temperature. The apparatus described herein readily accomplishes this result since the detection and indication of an overheated bearing depends entirely upon an unbalance produced in one of the bridge circuits by a difference in resistance in two resistance units which are associated with the bearings on two different axles. That is to say, equal temperature differences between detecting units will produce equal unbalances in the bridge circuits regardless of the actual normal operating temperatures at which the temperature differentials occur. Since equal bridge unbalances are produced by equal temperature differentials over the entire operating temperature range of the bearings, and since the detection of an overheated bearing depends entirely upon the unbalance produced in the bridge circuit by these temperature differentials, it is obvious that the actual temperature at which the overheated bearing indication is received will depend upon and vary with the actual normal operating temperatures of the bearings. Inasmuch as the normal operating temperature of the bearings varies with the ambient temperature the indicating temperatures will likewise vary with the ambient temperature.

It should be particularly noted that with the apparatus constructed as above described any open circuit or any short circuit will result in stopping the coding action of the coding relays CR1 and CR2. Since as was pointed out hereinbefore this coding action must be continuous in order to maintain the electropneumatic valve in the signal line energized, it follows that any open circuit or any short circuit will produce the same indication as would be produced by a hot bearing. It follows, therefore, that the apparatus works on the closed circuit principle and provides a safe means for detecting an overheated bearing.

Although I have herein shown and described only one form of hot bearing detectors embodying my invention, it is understood that various changes and modifications may be made therein within the scope of the appended claims without departing from the spirit and scope of my invention.

Having thus described my invention, what I claim is:

1. Apparatus for detecting a change in temperature of one zone with respect to another zone comprising two temperature responsive resistance units subjected to the temperatures of said two zones respectively, a Wheatstone bridge having said two resistance units included in two of the arms thereof in such manner that said bridge will be balanced or unbalanced according as said units are at approximately the same or different temperatures, contacts included in said two arms of said bridge, means effective so long as said resistance units are at approximately the same temperatures for alternately operating said contacts to periodically unbalance said bridge, and indication means selectively responsive to the periodic unbalancing of said bridge and to the unbalancing of said bridge due to said resistance units.

2. Apparatus for detecting a change in temperature of one zone with respect to another zone comprising two temperature responsive resistance units subjected to the temperatures of said two zones respectively, a Wheatstone bridge having said two resistance units included in two of the arms thereof in such manner that said bridge will be balanced or unbalanced according as said units are at approximately the same or different temperatures, a first coding relay having a contact included in one of said two bridge arms, a second coding relay having a contact included in the other of said two bridge arms, means effective when and only when said resistance units are at approximately the same temperature for alternately operating said coding relays to periodically unbalance said bridge, and indication means selectively responsive to the periodic unbalancing of said bridge and to the unbalancing of said bridge due to said resistance units.

3. Apparatus for detecting a difference in temperature between two zones comprising two temperature responsive resistance units subjected to the temperatures of said two zones respectively and each having a high temperature coefficient of resistance, two fixed resistors each having a zero temperature coefficient of resistance, a Wheatstone bridge having said fixed resistors disposed respectively in first and second arms thereof and said resistance units disposed respectively in the third and fourth arms thereof, the parts being so proportioned that said bridge will be balanced insofar as said resistors and resistance units are concerned so long as said resistance units are at approximately the same temperatures but will become unbalanced upon a difference in the temperatures of said two resistance units, a source of current connected across the two opposite terminals of said bridge which are disposed respectively at the junction of said first and second arms and the junction of said third and fourth arms, a detector relay connected across the other two terminals of said bridge, a first coding relay having a contact disposed in the said third arm of said bridge, a second coding relay having a contact disposed in said fourth arm of said bridge, means for alternately energizing said coding relays to periodically unbalance said bridge so long as said bridge remains balanced insofar as said resistance units are concerned, and indication means controlled in part by said detector relay and selectively responsive to the periodic unbalancing of said bridge and to the unbalancing of said bridge due to said resistance units.

4. Apparatus for detecting a difference in temperature between two zones comprising two temperature responsive resistance units subjected to the temperatures of said two zones respectively and each having a high temperature coefficient of resistance, two fixed resistors each having a zero temperature coefficient of resistance, a Wheatstone bridge having said fixed resistors disposed respectively in first and second arms thereof and said resistance units disposed respectively in the third and fourth arms thereof, the parts being so proportioned that said bridge will be balanced insofar as said resistors and resistance units are concerned so long as said resistance units are at approximately the same temperatures but will become unbalanced upon a difference in the temperatures of said two resistance units, a source of current connected across the two opposite terminals of said bridge which are disposed respectively at the junction of said first and second arms and the junction of said third and fourth arms, a detector relay connected across the other two terminals of said bridge, a first coding relay having a contact disposed in the said third arm of said bridge, a second coding relay having a contact disposed in said fourth arm of said bridge, means including a stepping relay controlled by said detector relay and by said coding relays for alternately energizing said coding relays to periodically unbalance said bridge so long as said bridge remains in balance insofar as said resistance units are concerned, and indication means selectively responsive to the periodic unbalancing of said bridge and to the unbalancing of said bridge due to said resistance units.

5. Apparatus for detecting a difference in temperature between two zones comprising two temperature responsive resistance units subjected to the temperatures of said two zones respectively and each having a high temperature coefficient of resistance, two fixed resistors each having a zero temperature coefficient of resistance, a Wheatstone bridge having said fixed resistors disposed respectively in first and second arms thereof and said resistance units disposed respectively in the third and fourth arms thereof, the parts being so proportioned that said bridge will be balanced insofar as said resistors and resistance units are concerned so long as said resistance units are at approximately the same temperatures but will become unbalanced upon a difference in the temperatures of said two resistance units, a source of current connected in series with a ballast resistance across the two opposite terminals of said bridge which are disposed respectively at the junction of said first and second arms and the junction of said third and fourth arms, a detector relay connected across the other two terminals of said bridge, a first coding relay having a contact disposed in the said third arm of said bridge, a second coding relay having a contact disposed in said fourth arm of said bridge, means for alternately energizing said coding relays to periodically unbalance said bridge so long as said bridge remains balanced insofar as said resistance units are concerned, and indication means controlled in part by said detector relay and selectively responsive to the periodic unbalancing of said bridge and to the unbalancing of said bridge due to said resistance units.

6. A hot bearing detector for a railway car comprising two resistance units subjected respectively to the temperature of the bearings for two different axles of the car, a Wheatstone bridge having said resistance units included in two different arms of the bridge in such manner that a difference in temperature of said bearings will unbalance said bridge, means including two coding relays for periodically unbalancing said bridge in alternately opposite directions, said means being effective only so long as said bridge is balanced insofar as said resistance units are concerned, and indication means governed by said coding relays and selectively responsive when the periodic unbalancing of said bridge ceases due to the unbalancing of said bridge by a change in the value of one of said resistance units for indicating which of said resistance units is of the higher value.

7. A hot bearing detector for a railway car comprising two resistance units subjected respectively to the temperature of the bearings for two different axles of the car, a Wheatstone bridge having said resistance units included in two different arms of the bridge in such manner that a difference in temperature of said bearings will unbalance said bridge, two coding relays, means effective when either one of said relays is energized for unbalancing said bridge, means for periodically operating said relays to periodically unbalance said bridge as long as said bridge is in balance insofar as said resistance units are concerned, and indication means selectively responsive to the periodic unbalancing of said bridge and the unbalancing of said bridge due to said resistance units.

8. A hot bearing detector for a railway car comprising a Wheatstone bridge having included therein two resistance units disposed respectively in two different arms of the bridge in such manner that so long as the resistances of both units are approximately the same the bridge will be balanced but that a change in resistance of one unit relative to that of the other unit will unbalance the bridge, said two resistance units being subjected to the temperatures of two different bearings on the car so as to provide continual comparison of the temperatures of the bearings, relay means including contacts disposed in said two arms of said bridge for alternately opening the bridge arms to periodically unbalance said bridge when and only when the resistances of said resistance units are approximately the same, a slow releasing relay controlled by said relay means in such manner that its armature will remain continually closed when said relay means are operating to periodically unbalance said bridge, and indication means controlled by said slow releasing relay and said detector relay.

9. A hot bearing detector for a car included in a train provided with a signal pipe extending from the car to the locomotive and connected in the locomotive with a whistle valve mechanism, said mechanism being effective upon a reduction in pressure in the signal pipe to sound a whistle; an electropneumatic valve effective when deenergized to cause a reduction in pressure in said signal pipe, two resistance units subjected to the temperature of two different bearings associated with two different axles of the car, each said resistance unit having a high temperature coefficient of resistance, a Wheatstone bridge having said resistance units included in two different arms thereof in such manner that a predetermined difference in temperature between said resistance units will unbalance said bridge, means for periodically unbalancing said bridge as long as said resistance units remain at approximately the same temperature, and means for continuously energizing said electropneumatic valve or for periodically energizing and deenergizing said valve according as said bridge is being periodically unbalanced or is unbalanced due to a difference in temperature of said resistance units.

10. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, means effective when said detector relay is deenergized for energizing said second or said first coding relay according as said normal or said reverse contacts of said stepping relay are then closed, whereby when said bridge is balanced insofar as said resistance units are concerned said coding relays will become alternately energized to periodically unbalance said bridge, and indication means selectively responsive to the periodic or steady unbalancing of said bridge.

11. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, means effective when said detector relay is deenergized for energizing said second or said first coding relay according as said normal or said reverse contacts of said stepping relay are then closed, whereby when said bridge is balanced insofar as said resistance units are concerned said coding relays will become alternately energized to periodically unbalance said bridge, and indication means jointly controlled by said detector relay and said coding relays.

12. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, means effective when said detector relay is deenergized for energizing said second or said first coding relay according as said normal of said reverse contacts of said stepping relay are then closed, whereby when said bridge is balanced insofar as said resistance units are concerned said coding relays will become alternately energized to periodically unbalance said bridge, a checking relay provided with a first energizing circuit closed when said first coding relay is energized and the normal contacts of said stepping relay are closed and a second energizing circuit closed when said second coding relay is energized and the reverse contacts of said stepping relay are closed, said checking relay being sufficiently slow releasing to retain its armature closed between the time interval which elapses for the duration of successive energizations of said coding relays when they are operating to periodically unbalance said bridge, and an indication circuit controlled by said checking relay.

13. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, means effective when said detector relay is deenergized for energizing said second or said first coding relay according as said normal or said reverse contacts of said stepping relay are then closed, whereby when said bridge is balanced insofar as said resistance units are concerned said coding relays will become alternately energized to periodically unbalance said bridge, a checking relay provided with a first enerigizing circuit closed when said first coding relay is energized and the normal contacts of said stepping relay are closed and a second energizing circuit closed when said second coding relay is energized and the reverse contacts of said stepping relay are closed, said checking relay being sufficiently slow releasing to retain its armature closed for the duration of the time interval which elapses between successive energizations of said coding relays when they are operating to periodically unbalance said bridge, a first indication circuit controlled by said checking relay, and a second indication circuit controlled by said checking relay and said detector relay.

14. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, a checking relay provided with a first energizing circuit including a normal polar contact of said stepping relay and a front contact of said first coding relay and with a second energizing circuit including a reverse polar contact of said stepping relay and a front contact of said second coding relay, a repeater relay energized over a front contact of said checking relay, an energizing circuit for said first coding relay including a back contact of said detector relay, a front contact of said repeater relay and a reverse contact of said stepping relay; an energizing circuit for said second coding relay including a back contact of said detector relay, a front contact of said repeater relay, and a normal contact of said stepping relay, and indication means controlled by said checking and detector relays.

15. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, a checking relay provided with a first energizing circuit including a normal polar contact of said stepping relay and a front contact of said first coding relay and with a second energizing circuit including a reverse polar contact of said stepping relay and a front contact of said second coding relay, a repeater relay energized over a front contact of said checking relay, an energizing circuit for said first coding relay including a back contact of said detector relay, a front contact of said repeater relay and a reverse contact of said stepping relay, an energizing circuit for said second coding relay including a back contact of said detector relay, a front contact of said repeater relay, and a normal contact of said stepping relay, a first indication means controlled by front contacts of said checking and repeater relays, and a second indication means controlled by a back contact of said checking relay and a front contact of said detector relay.

16. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, a checking relay provided with a first energizing circuit including a normal polar contact of said stepping relay and a front contact of said first coding relay and with a second energizing circuit including a reverse polar contact of said stepping relay and a front contact of said second coding relay, a repeater relay energized over a front contact of said checking relay; an energizing circuit for said first coding relay including a back contact of said detector relay, a front contact of said repeater relay and a reverse contact of said stepping relay; an energizing circuit for said second coding relay including a back contact of said detector relay, a front contact of said repeater relay, and a normal contact of said stepping relay, a signal pipe on the car effective when vented to atmosphere to sound a whistle on the locomotive, an electropneumatic valve effective when deenergized to vent said signal pipe to atmosphere, and an energizing circuit for said valve controlled by front contacts of said checking and repeater relays.

17. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, a checking relay provided with a first energizing circuit including a normal polar contact of said stepping relay and a front contact of said first coding relay and with a second energizing circuit including a reverse polar contact of said stepping relay and a front contact of said second coding relay, a repeater relay energized over a front contact of said checking relay; a pneumatic relay on the car arranged to close a contact whenever the car is coupled in a train, a first energizing circuit for said first coding relay including a contact of said pneumatic relay, a back contact of said detector relay, a front contact of said repeater relay, and a reverse contact of said stepping relay; a second energizing circuit for said first coding relay including the contact of said pneumatic relay, a back contact of said repeater relay and a normal contact of said stepping relay; a first energizing circuit for said second coding relay including the contact of said pneumatic relay, a back contact of said detector relay, a front contact of said repeater relay and a normal contact of said stepping relay; a second energizing circuit for said second coding relay including the contact of said pneumatic relay, a back contact of said repeater relay and a reverse contact of said stepping relay, and indication means controlled by said checking and detector relays.

18. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, a checking relay provided with a first energizing circuit including a normal polar contact of said stepping relay and a front contact of said first coding relay and with a second energizing circuit including a reverse polar contact of said stepping relay and a front contact of said second coding relay, a repeater relay energized over a front contact of said checking relay, an energizing circuit for said first coding relay including a back contact of said detector relay, a front contact of said repeater relay and a reverse contact of said stepping relay, an energizing circuit for said second coding relay including a back contact of said detector relay, a front contact of said repeater relay, and a normal contact of said stepping relay; a first indication circuit including a back contact of said checking relay, a normal polar contact of said stepping relay and a front contact of said detector relay; and a second indication circuit including a back contact of said checking relay, a reverse polar contact of said stepping relay, and a front contact of said detector relay.

19. A hot bearing detector for a railway car including two resistance units subjected to the temperatures of two different bearings associated with two different axles of the car, each said resistance unit having a high temperature coefficient of resistance, two fixed resistors each having substantially a zero temperature coefficient of resistance, a Wheatstone bridge having said resistance units disposed respectively in first and second arms thereof and said resistors disposed in third and fourth arms thereof, the parts being so proportioned that said bridge will be balanced when and only when said resistance units are at approximately the same temperatures, whereby a change in temperature of one bearing without a corresponding change in the temperature of the other bearing will unbalance said bridge, a first coding relay having a contact included in said first arm of said bridge, a second coding relay having a contact included in said second arm of said bridge, a detector relay connected with said bridge so as to be deenergized or energized according as said bridge is balanced or unbalanced, a polarized stepping relay having normal and reverse contacts, means effective when said detector relay becomes energized for energizing said stepping relay to cause it to close its normal or its reverse contacts according as said first or said second coding relay is then energized, a checking relay provided with a first energizing circuit including a normal polar contact of said stepping relay and a front contact of said first coding relay and with a second energizing circuit including a reverse polar contact of said stepping relay and a front contact of said second coding relay, a repeater relay energized over a front contact of said checking relay, an energizing circuit for said first coding relay including a back contact of said detector relay, a front contact of said repeater relay and a reverse contact of said stepping relay, an energizing circuit for said second coding relay including a back contact of said detector relay, a front contact of said repeater relay, and a normal contact of said stepping relay, and indication means controlled by said checking, stepping and detector relays and effective when said bridge becomes unbalanced due to a change in temperature of one bearing without a corresponding change in temperature of the other bearing to indicate which bearing caused the unbalanced condition.

20. Self-checking apparatus for detecting when the impedance of an electric circuit element is of a predetermined value comprising a Wheatstone bridge which is balanced only when said circuit element is of said predetermined value and is effectively included in one of its arms, a source of current connected to the input terminals of said bridge for supplying current thereto, a detector relay deriving its energization from the output terminals of said bridge whereby said relay is maintained energized when the bridge is unbalanced and releases when the bridge is balanced, means controlled by said detector relay for unbalancing said bridge when said relay assumes its released position whereby said relay is reenergized to remove the unbalance caused thereby, a slow acting checking relay, and means for maintaining said checking relay in its energized position by intermittent energization dependent upon the periodic operation of said detector relay.

21. Self-checking apparatus for detecting when the impedance of an electric circuit element is of a predetermined value comprising a Wheatstone bridge having two ratio arms, a third arm which includes said circuit element and a fourth arm which includes a balancing impedance, said bridge having its input terminals normally connected to a source of current, a detector relay deriving its energization from connections to the output terminals of said bridge but which assumes its released position when the bridge is substantially balanced, a movable contact in the circuit for one arm of said bridge which in a first position enables the bridge to be balanced and in a second position unbalances the bridge regardless of the impedance of said circuit element, means responsive to the release of said relay for moving said contact to its second position, said means acting to restore said contact to its first position provided the relay assumes its energized position due to the resulting unbalance, a repeating relay, and means for maintaining said repeating relay energized dependent upon the alternate energization and release of said detector relay.

22. Self-checking apparatus for comparing the impedances of two electric circuit elements comprising a Wheatstone bridge having two arms which include said circuit elements and two which comprise fixed impedances, a source of current connected to two opposite terminals of said bridge for constantly supplying energy thereto, a detector relay, means for supplying said relay with energy in accordance with the potential difference at the other two terminals of said bridge whereby said relay is maintained energized unless the bridge is substantially balanced or in the event of a fault, means governed by said detector relay for varying the impedance of one arm of said bridge whenever said relay assumes its released position, to cause said relay to return at least temporarily to its energized position due to the resulting unbalance, in the event its release is due to the balanced condition of the bridge and not due to a fault, a checking relay, means for selectively maintaining said checking relay energized in response to the repeated energization and release of said detector relay by which the balanced condition of the bridge is made manifest, and indication means governed by said repeating relay.

23. Self-checking apparatus for comparing the impedances of two electric circuit elements comprising a Wheatstone bridge having four arms, two of which include said two circuit elements, the remaining two comprising fixed impedances, a source of current connected to two opposite terminals of said bridge for constantly supplying energy thereto, a detector relay, means for supplying said relay with energy in accordance with the potential difference at the other two terminals of said bridge due to unbalance, means governed by said relay for unbalancing the bridge whenever said relay assumes its released position to cause said relay to return at least temporarily to its energized position in the event its release is due to the balanced condition of the bridge and not due to a fault, and means selectively responsive to the periodic operation of said detector relay for indicating said balanced condition.

24. Self-checking apparatus for comparing the impedances of two electric circuit elements comprising a Wheatstone bridge having four arms, two of which include said two circuit elements, the remaining two comprising fixed impedances, a source of current connected to two opposite terminals of said bridge for constantly supplying energy thereto, a detector relay, means for supplying said relay with energy in accordance with the potential difference at the other two terminals of said bridge due to unbalance, a stepping relay, means for operating said stepping relay alternately between two positions in response to the repeated energization of said detector relay, slow acting means controlled by said detector relay in accordance with the position of said stepping relay for unbalancing two opposite arms of said bridge alternately one at a time whenever said detector relay assumes its released position to cause the detector relay to return at least temporarily to its energized position due to the resulting unbalance, a checking relay, and means controlled by said slow acting means for maintaining said checking relay in its energized position only so long as said stepping relay continues to operate between said two positions.

25. Self-checking apparatus for comparing the impedances of two electric circuit elements comprising a Wheatstone bridge having four arms two of which include said two circuit elements, the remaining two comprising fixed impedances, a source of current connected to two opposite terminals of said bridge for constantly supplying energy thereto, a detector relay, means for supplying said relay with energy in accordance with the potential difference at the other two terminals of said bridge due to unbalance, a stepping relay having normal and reverse contacts, a first and a second coding relay, a circuit closed upon the release of said detector relay for energizing said first coding relay if the reverse contacts of said stepping relay are then closed or for energizing said second coding relay if the normal contacts of said stepping relay are then closed, means comprising contacts of said coding relays for unbalancing said bridge in one direction when the first coding relay is picked up and in the opposite direction when the second coding relay is picked up, circuits effective when the detector relay and the first or second coding relay are both energized for operating said stepping relay to its normal or reverse position to effect the release of the energized coding relay and thereby remove the unbalance caused thereby, a slow acting checking relay, and two energizing circuits for said checking relay one including a normal contact of said stepping relay and a front contact of the first coding relay, the other including a reverse contact of said stepping relay and a front contact of the second coding relay.

26. Self-checking apparatus for comparing the impedances of two electric circuit elements comprising a Wheatstone bridge having four arms, two of which include said two circuit elements, the remaining two comprising fixed impedances, a source of current connected to two opposite terminals of said bridge for constantly supplying energy thereto, a detector relay, means for supplying said relay with energy in accordance with the potential difference at the other two terminals of said bridge due to unbalance, a stepping relay having normal and reverse contacts, a first and second coding relay, a checking relay, two circuits for energizing said first or second coding relay effective when said checking relay is released and including normal and reverse contacts respectively of said stepping relay, two circuits for energizing said first or second coding relay effective when said checking relay is picked up which include the reverse and normal contacts respectively of said stepping relay and also include a back contact of said detector relay, means comprising contacts of said coding relays for unbalancing said bridge in one direction when the first coding relay is picked up and in the opposite direction when the second coding relay is picked up, circuits effective when the detector relay and the first or second coding relay are both energized for operating said stepping relay to its normal or reverse position to effect the release of the energized coding relay and thereby remove the unbalance caused thereby, two energizing circuits for said checking relay, one including a normal contact of said stepping relay and a front contact of the first coding relay, the other including a reverse contact of said stepping relay and a front contact of the second coding relay, two indicating devices, and energizing circuits for said devices including normal and reverse contacts respectively of said stepping relay and also including front contacts of said detector relay and a back contact of said checking relay.

27. Self-checking apparatus for comparing the impedance of two electric circuit elements comprising a Wheatstone bridge having four arms comprising said two circuit elements and two fixed impedances, a source of current connected to two opposite terminals of said bridge, a detector relay deriving its energization from said source in accordance with the potential difference at the other two terminals of said bridge, and which releases whenever the bridge is substantially balanced, means controlled by a contact of said relay for unbalancing said bridge whenever said relay releases whereby said relay is reenergized to remove the unbalance caused thereby, a checking relay, and means for maintaining said checking relay energized in response to the periodic operation of said detector relay.

28. Self-checking apparatus for comparing the impedance of two circuit elements comprising a Wheatstone bridge having four arms comprising said two circuit elements and two fixed impedances, a source of current connected to two opposite terminals of said bridge, a detector relay deriving its energization from said source in accordance with the potential difference at the other two terminals of said bridge, said relay releasing whenever the bridge is substantially balanced, a stepping relay governed by said detector relay, means governed by said stepping relay for periodically unbalancing said bridge in alternately opposite directions to effect the periodic energization of said detector relay provided the bridge is balanced insofar as said circuit elements are concerned, and indication means selected by said stepping relay and rendered effective when the periodic operation of said detector relay ceases due to a change in the impedance of one of said circuit elements for indicating which of said elements is of the higher impedance.

29. Self-checking apparatus for detecting a change in the relative impedance of two circuit elements comprising a Wheatstone bridge having said two circuit elements included in two of the arms thereof in such manner that the bridge will be balanced only when said circuit elements have a given relative impedance, contacts included in two arms of said bridge, means effective so long as said circuit elements have said given relative impedance for alternately operating said contacts to periodically unbalance said bridge in opposite directions, and indication means selectively responsive to the periodic unbalancing of said bridge and to the unbalancing of said bridge due to said circuit elements.

30. Self-checking apparatus for comparing the impedance of an electric circuit element with a balancing impedance comprising a Wheatstone bridge having four arms comprising two fixed impedances, said circuit element and said balancing impedance, a source of direct current connected to the two input terminals of said bridge, a direct current detector relay arranged to be energized from the output terminals of said bridge by current flowing in one direction or the other depending upon whether the impedance of said circuit element is greater or less than a given value, two slow acting relays arranged to be energized alternately in response to the repeated release of said detector relay, means governed by said slow acting relays for unbalancing said bridge to cause the repeated energization of said detector relay by current flowing alternately in opposite directions, and indication means rendered effective when said detector relay becomes steadily energized and selected by the last operated slow acting relay for indicating whether the impedance of said circuit element is greater or less than said given value.

31. Self-checking apparatus for detecting a change in the impedance of any one of a plurality of circuit elements comprising a plurality of Wheatstone bridges each having a different one of said circuit elements included in one of the arms thereof in such manner that the bridge will be balanced only when such circuit element has a given value, a first coding relay having contacts in one arm of each bridge, a second coding relay having contacts in the other arm of each bridge, means effective only when the impedance of each circuit element is of the value required to balance the corresponding bridge for alternately operating said coding relays to periodically and simultaneously unbalance said bridges in opposite directions, and indication means selectively responsive to said periodic unbalancing and due to the unbalancing due to changes in the impedance of one or more of said circuit elements.

32. Self-checking apparatus for detecting changes in the impedances of electric circuit elements comprising a plurality of Wheatstone bridges each having a source of current connected to its input terminals and a different one of said circuit elements included in one of the arms thereof in such manner that the bridge is balanced only when the impedance of such element is of a given value, a plurality of detector relays each supplied with current from a different one of said bridges when unbalanced and adapted to indicate by its release when such bridge is substantially balanced, slow acting means rendered effective to unbalance said bridges whenever said detector relays assume their released position and to remove such unbalance when said detector relays are energized whereby said detector relays are caused to indicate that each of said circuit elements has a value required to balance the corresponding bridge by the periodic operation of said slow acting means, a checking relay, and means selectively responsive to the periodic operation of said slow acting means for maintaining said checking relay energized to indicate the balanced condition of said plurality of bridges.

33. Self-checking apparatus for detecting changes in the impedance of electric circuit elements comprising a plurality of Wheatstone bridges each having a source of current connected to its input terminals and a different one of said circuit elements included in one of the arms thereof in such manner that the bridge is balanced only when the impedance of such element has a given value, a plurality of detector relays each supplied with current from the output terminals of a different one of said bridges when unbalanced and adapted to indicate by its release when such bridge is substantially balanced, a first slow acting relay effective when operated to unbalance each of said bridges in a given direction, a second slow acting relay effective when operated to unbalance each of said bridges in the opposite direction, means controlled jointly by said detector relays for operating said slow acting relays alternately and momentarily to effect the periodic operation of said detector relays provided the impedance of each of said circuit elements is of the value required to balance the corresponding bridge, a checking relay, means selectively responsive to said alternate operation of said slow acting relays for maintaining said checking relay energized, and means governed by said checking relay when released and by each detector relay when energized for indicating the unbalanced condition of the corresponding bridge.

ALFRED B. MILLER.

REFERENCES CITED

The following references are of record in the file of this patent:

UNITED STATES PATENTS

| Number | Name | Date |
| --- | --- | --- |
| 2,385,487 | Baughman | Sept. 25, 1945 |